United States Patent
Clauer et al.

(10) Patent No.: US 12,084,130 B2
(45) Date of Patent: Sep. 10, 2024

(54) DRIVERLESS TRANSPORT VEHICLE AND METHOD FOR COUPLING A DRIVERLESS TRANSPORT VEHICLE TO A SEMI-TRAILER

(71) Applicants: Bayerische Motoren Werke Aktiengesellschaft, Munich (DE); Stäubli WFT GmbH, Sulzbach-Rosenberg (DE)

(72) Inventors: Dana Clauer, Munich (DE); Marco Prüglmeier, Munich (DE); Thomas Irrenhauser, Munich (DE); Josef Eckl, Prackenbach (DE); Fabian Wittich, Gebenbach (DE)

(73) Assignees: Bayerische Motoren Werke Aktiengesellschaft, Munich (DE); Stäubli WFT GmbH, Sulzbach-Rosenberg (DE)

( * ) Notice: Subject to any disclaimer, the term of this patent is extended or adjusted under 35 U.S.C. 154(b) by 538 days.

(21) Appl. No.: 17/297,914

(22) PCT Filed: Nov. 29, 2019

(86) PCT No.: PCT/EP2019/083082
§ 371 (c)(1),
(2) Date: May 27, 2021

(87) PCT Pub. No.: WO2020/109549
PCT Pub. Date: Jun. 4, 2020

(65) Prior Publication Data
US 2022/0017162 A1    Jan. 20, 2022

(30) Foreign Application Priority Data
Nov. 30, 2018    (DE) .................. 10 2018 130 586.9

(51) Int. Cl.
*B62D 53/12*    (2006.01)
*B60D 1/64*    (2006.01)
(Continued)

(52) U.S. Cl.
CPC ............ *B62D 53/125* (2013.01); *B60D 1/64* (2013.01); *B60T 7/20* (2013.01); *B62D 53/0842* (2013.01)

(58) Field of Classification Search
CPC ............ B62D 53/125; B62D 53/0842; B62D 53/0857; B60D 1/64; B60D 1/015;
(Continued)

(56) References Cited

U.S. PATENT DOCUMENTS 2,710,201 A    6/1955    Winn
3,391,950 A    7/1968    Fay
(Continued)

FOREIGN PATENT DOCUMENTS

CN    1922041    2/2007
CN    100443350    12/2008
(Continued)

OTHER PUBLICATIONS

PCT; App. No. PCT/EP/2019/083082; International Search Report and Written Opinion mailed Feb. 7, 2020.
(Continued)

*Primary Examiner* — Kevin Hurley
*Assistant Examiner* — Marlon A Arce
(74) *Attorney, Agent, or Firm* — FITCH EVEN TABIN & FLANNERY, LLP

(57) ABSTRACT

The invention relates to a driverless transport vehicle for moving a semi-trailer. The driverless transport vehicle comprises a coupling device which is designed to establish a connection with the braking system and/or an electronic
(Continued)

system of a semi-trailer. The invention also relates to a method for coupling a driverless transport vehicle to a semi-trailer.

14 Claims, 4 Drawing Sheets

(51) Int. Cl.
*B60T 7/20* (2006.01)
*B62D 53/08* (2006.01)
(58) Field of Classification Search
CPC ......... B60D 1/62; B60T 7/20; B60T 2201/10; B60T 7/22; B60T 8/17; B60T 8/1708; B60T 13/263; B60T 13/265
See application file for complete search history.

(56) References Cited

U.S. PATENT DOCUMENTS

| | | | |
|---|---|---|---|
| 3,506,230 A | 4/1970 | Vivian | |
| 3,603,544 A | 9/1971 | Griffith | |
| 3,628,811 A | 12/1971 | Rivers | |
| 5,109,940 A | 5/1992 | Yardley | |
| 5,154,249 A | 10/1992 | Yardley | |
| 5,559,696 A | 9/1996 | Borenstein | |
| 6,588,418 B1 | 7/2003 | Loving | |
| 7,429,051 B2 | 9/2008 | Bauer | |
| 7,731,215 B2 * | 6/2010 | Alguera | B60T 17/043 280/421 |
| 7,793,966 B2 * | 9/2010 | Richter | B60D 1/64 280/433 |
| 8,798,842 B2 | 8/2014 | Woolf | |
| 8,838,322 B1 | 9/2014 | Zhu | |
| 8,930,140 B2 | 1/2015 | Trombley | |
| 10,562,463 B1 | 2/2020 | Speer | |
| 11,358,660 B2 * | 6/2022 | Newton | B62D 53/0814 |
| 11,420,691 B2 | 8/2022 | Köster | |
| 2003/0233177 A1 | 12/2003 | Johnson | |
| 2006/0037787 A1 | 2/2006 | Hammonds | |
| 2006/0293800 A1 | 12/2006 | Bauer | |
| 2008/0036175 A1 * | 2/2008 | Alguera | B60T 17/043 280/420 |
| 2011/0037241 A1 | 2/2011 | Temple | |
| 2011/0107938 A1 | 5/2011 | Weidemann | |
| 2012/0191285 A1 | 7/2012 | Woolf | |
| 2013/0193669 A1 | 8/2013 | Glazner | |
| 2013/0226390 A1 | 8/2013 | Luo | |
| 2014/0251556 A1 * | 9/2014 | Orton | E05F 15/676 160/188 |
| 2015/0045992 A1 | 2/2015 | Ashby | |
| 2017/0192438 A1 | 7/2017 | Morimoto | |
| 2017/0231427 A1 | 8/2017 | Cathey | |
| 2018/0022405 A1 | 1/2018 | Gecchelin | |
| 2018/0341259 A1 | 11/2018 | Stroebel | |
| 2019/0064828 A1 | 2/2019 | Meredith | |
| 2019/0095861 A1 | 3/2019 | Baldwin | |
| 2019/0337342 A1 | 11/2019 | Genheimer et al. | |
| 2019/0367107 A1 | 12/2019 | Grossman | |
| 2020/0055357 A1 * | 2/2020 | Laine | B60D 1/58 |
| 2020/0150686 A1 | 5/2020 | Wieschemann | |
| 2022/0024529 A1 | 1/2022 | Clauer | |
| 2022/0024530 A1 | 1/2022 | Clauer | |
| 2022/0048497 A1 | 2/2022 | Delizo | |
| 2022/0055430 A1 | 2/2022 | Delizo | |

FOREIGN PATENT DOCUMENTS

| | | |
|---|---|---|
| CN | 104417634 | 3/2015 |
| CN | 105966177 | 9/2016 |
| CN | 106741239 | 5/2017 |
| CN | 106774300 | 5/2017 |
| CN | 107264629 | 10/2017 |
| CN | 107340771 | 11/2017 |
| CN | 207424675 | 5/2018 |
| CN | 108508895 | 9/2018 |
| CN | 108839725 | 11/2018 |
| DE | 10335264 A1 | 3/2005 |
| DE | 102004051760 A1 | 4/2006 |
| DE | 102008014572 A1 | 9/2009 |
| DE | 102009052382 | 5/2011 |
| DE | 102012207269 | 11/2013 |
| DE | 102016218603 A1 | 3/2018 |
| DE | 202018104542 U1 | 8/2018 |
| DE | 102018105998 B3 | 5/2019 |
| FR | 2938812 | 5/2010 |
| JP | 4553267 | 9/2010 |
| WO | 2014131624 | 9/2014 |
| WO | 2018055321 A2 | 3/2018 |
| WO | 2018162031 A1 | 9/2018 |
| WO | 2018202483 | 11/2018 |

OTHER PUBLICATIONS

DPMA; App. No. 10 2018 130 586.9; Search Report mailed Oct. 9, 2020.
Wikipedia; "LKW-Bremsanlage"; https://de.wikipedia.org/w/index.php?title=LKW-Bremsanlage&oldid=I.
EP Examination Report; European Application No. 19 816 237.2; dated Sep. 7, 2023 (14 pages).
Article 94 (3) EPC; European Application No. 19817173.8; dated Jul. 29, 2022; 16 pages.
Chinese Office Action; Chinese Application No. 201980078776.6; dated Aug. 31, 2022; 24 pages.
Chinese Office Action; Chinese Application No. 201980078776.6; dated Feb. 27, 2023; 18 pages.
Clauer, Dana: Concept creation for the implementation of automated warehouse on wheels processes by means of driverless transport systems using the example of the BMW Group Werk Leipzig. in: 35. Deutscher Logistik-Kongress; dated Oct. 18, 2018.
CNSR; Chinese Application No. 201980078776.6; dated Feb. 27, 2023; 2 pages.
DPMA; App. No. 10 2018 130 584.2; Search Report mailed Oct. 9, 2020.
EP Office Action; European Application No. 19817173.8; dated Apr. 11, 2023; 8 pages.
German Office Action and Search Report; German Application No. 102018130585.0 dated Sep. 10, 2020; 17 pages,.
KUKA—Robots & Automation; "Clever Autonomy for Mobile Robots—KUKA Navigation Solution"; hllps://www.youtube ; dated May 26, 2016.
OSRAM; "Meilenstein fur Laser-Sensoren in selbslfahrenden Autos"; https://www.osram-group.de/de-de/media/press-releases/pr-2016/07-11-2016; Nov. 7, 2016.
PCT; App. No. PCT/EP2019/083076; International Search Report and Written Opinion mailed Feb. 7, 2020.
PCT; App. No. PCT/EP2019/083079; International Search Report and Written Opinion mailed Mar. 3, 2020.
Ullrich, G,; Albrecht, T.: Driverless transport systems. 2nd edition, Wiesbaden, Springer, 2014, p. 127, 129.- ISBN 978-3-8348-2591-9; 4 pages.
Chinese Office Action from Chinese Application No. 201980078776.6; dated Oct. 29, 2023; in Chinese with English Translation (32 pages).
Clauer, D; "Konzepterstellung für die Implementierung automatisierter Warehouse on Wheels Prozesse mittels fahrerloser Transportsysteme am Beispiel des BMW Group Werks Leipzig"; https://mediatum.ub.tum.de/node?id=1518793&change_language=en: (2 pages).
Deutscher Logistik Congress Oct. 17-19, 2018; "C4 Thesis Conference" https://www.gbv.de/dms/tib-ub-hannover/1035300524.pdf (5 pages).
European Patent Office, Commnication pursuant to Article 94(3) EPC, Examination Report, issued Mar. 26, 2024 for Euopean Application No. 19 817 173.8 (9 pages) and English Translation (9 pages).
Office Action from U.S. Appl. No. 17/297,937; dated Oct. 26, 2023; in English (11 pages).

(56) References Cited

OTHER PUBLICATIONS

Office Action from U.S. Appl. No. 17/297,941; dated Oct. 10, 2023; In English (13 pages).
Prof. Dr.-Ing. Fottner, Johannes; "Publications of the chair" https://www.mec.ed.tum.de/en/fml/research/publications/ (2 pages).
The Federal Logistics Association (BVL) participant in the 35th edition of the German Logistics Exhibition in Berlin from Nov. 17 to 19, 2018; https://www.vallee-partner.de/blog/dlk18 (1 page).
Office Action from U.S. Appl. No. 17/297,941; dated Apr. 8, 2024; in English (13 pages).
Office Action from U.S. Appl. No. 17/297,937; dated Apr. 18, 2024; in English (12 pages).

\* cited by examiner

DRIVERLESS TRANSPORT VEHICLE AND METHOD FOR COUPLING A DRIVERLESS TRANSPORT VEHICLE TO A SEMI-TRAILER

CROSS-REFERENCE TO RELATED APPLICATIONS

This application is a U.S. national phase application of International Application No. PCT/EP2019/083082, filed Nov. 29, 2019, designating the United States, which claims priority to German Application No. 10 2018 130 586.9, filed Nov. 30, 2018.

FIELD

A driverless transport vehicle for moving a semi-trailer is specified. Furthermore, a method for coupling a driverless transport vehicle to a semi-trailer is specified.

BACKGROUND

According to the current prior art, trailers in the form of semi-trailers or trailers are transported with a classical tractor in production factories. If a trailer is ready for collection, the brake is usually disengaged. Thus, rolling away of the trailer has to be prevented by bumps on the ground; this is very inconvenient. In addition, these tractors are designed for the long-distance employment on the road. In the factory, it often has to be maneuvered, however, the tractors are not very maneuverable. For driving the operating machines, an employee is additionally required, who drives the tractor. Mostly, the drives are only very short, which is not very efficient with respect to the fuel consumption.

It is disadvantageous in the known tractors, that at least one employee is respectively required, who drives the tractor. Further, tractors are not ideally suitable for factory premises.

It is an object to be solved of at least some embodiments to specify a driverless transport vehicle, by which a semi-trailer can be moved. It is a further object to specify a method for moving a semi-trailer by a driverless transport vehicle.

SUMMARY

These objects are solved by subject matters according to the independent claims. Advantageous embodiments and developments of the subject matter are further apparent from the dependent claims, the following description and from the drawings.

A driverless transport vehicle described here comprises a coupling device, which is configured to establish a connection to a braking system and/or an electronic system of a semi-trailer.

Thus, according to the invention, trailers, which are for example placed on factory premises, can be automatically moved with the aid of surface-movable driverless transport systems (FTS). The transport system drives to below the trailer and lifts the trailer. The trailer is automatically transported to the destination and placed there.

The driverless transport vehicle can also be referred to as driverless transport system (FTS) or as an automated guided vehicle (AGV).

Thus, by the measures according to the invention, it is achieved that an access to the brakes of the trailer and/or to the lighting of the trailer is allowed such that the problems existing heretofore can be avoided that the trailer is only allowed to be moved on identified paths and in daylight due to the lack of environmental lighting. Rather, the trailer can thus also be moved with a corresponding environmental lighting and also at night.

By the access possible according to the invention via corresponding compressed air and brake lines, respectively, to the brakes of the trailer, a special placing location, at which the trailer is for example secured with bumps, can additionally be avoided. In addition, the trailers can be moved with higher speed since the braking power for braking the articulated truck can be applied not alone by the driverless transport vehicle, but also by the brakes of the trailer.

In addition, it is for example possible to access the air suspension of the trailer and for example to lift individual lift axles via respective compressed air and control lines to for example achieve a better maneuverability of the trailer. In particular, this is of advantage for achieving narrow turning circles of the trailer and of the entire articulated truck, respectively. Additionally, in case of container trailers, a change of the container from the container chassis of the trailer can then also be performed.

The surface-movable driverless transport system is in particular used for the transport of a trailer on the factory premises. Therein, the driverless transport system lifts the trailer at the front end and can move it with the aid of the wheels at the rear end of the trailer. The driverless transport system receives the trailer at the placing location and automatically takes it to the desired factory hall and an unloading and/or loading site, respectively. Therein, the driverless transport system can recognize obstacles in the vicinity of the platform and of the optionally attached semi-trailer with the aid of sensors and optionally drive around them or stop.

Preferably, the driverless transport system can tow loads up to 40 t, thus for example a semi-trailer with 40 t. Furthermore, the driverless transport vehicle is indoor and outdoor enabled and comprises an omnidirectional drive. Preferably, the driverless transport vehicle further comprises the most recent sensor and navigation technology.

The driverless transport system can be employed for the traction operation of different variants of semi-trailers, for example of tautliners, box trailers, low bed trailers, container trailers, tank trailers.

Preferably, the coupling device is automatically connectable to the braking system and/or to the electronic system of the semi-trailer. Hereby, a particularly fast and automatic connection of the driverless transport vehicle to the semi-trailer arises. Therein, automatic in particular means that corresponding sensors or the like are provided, by means of which a relative position of respective ports, plugs or the like on the side of the driverless transport vehicle and the trailer is ascertained and the ports, plugs or the like are connected to each other depending thereon in that they are engaged with each other—by means of displacement of the driverless transport vehicle in relation to the trailer and/or by means of displacement of the ports, plugs or the like in relation to each other by corresponding adjusting devices. In the coupled position, the respective ports, plugs or the like are then preferably automatically lockable. Preferably, the respective detaching operations of the ports, plugs or the like are similarly automatically effected in correspondingly reversed manner. Hereby, a fully automated factory yard or similar logistics center monitored by a corresponding control system is for example representable.

According to a further embodiment, the coupling device comprises at least one compressed air port. Hereby, the trailer can be supplied with compressed air, which is generated and/or stored in the driverless transport vehicle. Hereby, not only a braking system of the trailer, but for example also an air spring system can for example be operated with compressed air.

According to a further embodiment, the coupling device comprises two compressed air ports, in particular a compressed air port for a brake line and a compressed air port fora supply line or storage line.

The port and/or the ports can for example be coupled via an adapter, which can comprise e.g. a magnetic mount. Hereby, particularly fast and reliable coupling and decoupling of the port or the ports are possible.

According to a further embodiment, the coupling device comprises a plug, in particular a multipolar plug. For example, the plug can be formed 15-pole.

In alternative embodiments, the coupling device can be formed to couple the semi-trailer and the port or ports thereof, respectively, from below or from the front.

Therein, both types of connection allow a simple and process-reliable automatic coupling of the ports on the side of the driverless transport vehicle and on the side of the trailer.

Furthermore, the driverless transport vehicle can comprise a coupling device, which comprises an adapter unit for connecting to the kingpin of the semi-trailer in form- and/or force-fit manner. In particular, the coupling device includes a fifth-wheel coupling with a fifth-wheel plate, which is carried by the driverless transport system. Therein, the fifth-wheel coupling serves for supporting and carrying the trailer with intervention of the kingpin on the one hand and for locking the kingpin to the fifth-wheel plate on the other hand among other things. Herein, a normalized fifth-wheel coupling and fifth-wheel plate are in particular employed to be able to receive and maneuver as many usual semi-trailers as possible.

Moreover, the coupling device can comprise a device for lifting the semi-trailer, in particular a hydraulic device. This device can for example be arranged between the fifth-wheel coupling and the structure/body of the driverless transport system such that the fifth-wheel coupling (and the front area of the semi-trailer/trailer associated therewith) can be lifted and lowered in relation to the structure/body of the driverless transport system. Alternatively hereto, the chassis of the driverless transport system could also be provided with an air suspension or the like as the said device, as it is usually also the case in semi-trailer tractors, such that lifting and lowering the front part of the semi-trailer/trailer is effected by height adjustment of the structure/body of the driverless transport system and thereby also of the fifth-wheel coupling.

According to a further embodiment, the driverless transport vehicle comprises a plurality of sensors for surroundings detection. For example, the driverless transport vehicle can comprise a substantially cuboid base body, at which at least four laser sensors are arranged. At least one laser sensor for surroundings recognition can respectively be arranged e.g. at four different corners or edges of the base body of the driverless transport vehicle. In addition, the driverless transport vehicle comprises sensors for automatically coupling the coupling device of the driverless transport vehicle to the kingpin in further configuration of the invention. Hereby, the fifth-wheel coupling can for example be aligned with and coupled to the kingpin in simple manner. Hereto, the driverless transport vehicle is moved in relation to the kingpin in particular depending on the data ascertained by the corresponding sensors. Alternatively hereto, it would optionally also be conceivable to support the fifth-wheel coupling relatively movable to the structure/body of the driverless transport vehicle in vehicle transverse direction and/or in vehicle longitudinal direction to hereby achieve the coupling position between fifth-wheel coupling and kingpin.

According to a further embodiment, the driverless transport vehicle comprises a plurality of drive wheels, which are controllable such that the driverless transport vehicle is omnidirectionally movable. For example, at least two drive wheels can be applied with different drive torques and/or oppositely oriented drive torques and/or oppositely oriented rotational directions. In particular, the driverless transport system comprises at least one front axle and at least one rear axle and corresponding drive wheels associated with the axles, respectively, which are operable with different drive torques and/or oppositely oriented drive torques and/or oppositely oriented rotational directions.

Furthermore, a method for coupling a driverless transport vehicle to a semi-trailer is specified. Therein, a driverless transport vehicle, which can comprise one or more features of the above mentioned embodiments, as well as a semi-trailer or so-called trailer are provided.

Furthermore, the coupling device of the driverless transport vehicle is connected to a braking system and/or an electronic system of the semi-trailer. Preferably, the connection is automatically effected. Hereto, the coupling device can comprise one or more compressed air ports and/or an electrical port, which is or are connected to one or more compressed air ports and an electrical port of the semi-trailer, respectively.

By the driverless transport vehicle described here and the method described here, respectively, an access to the compressed air brake and the electronics of the trailer can advantageously be effected. Thereby, road utilization and drives on the entire factory premises, respectively, are possible. Furthermore, utilization in the night is possible since the lighting system of the semi-trailer can be activated.

BRIEF DESCRIPTION OF THE DRAWINGS

Further advantages and advantageous embodiments of the driverless transport vehicle described here and of the method for coupling a driverless transport vehicle to a semi-trailer are apparent from the embodiments described in the following in context of FIGS. 1 to 4. There is shown in.

DESCRIPTION OF THE PREFERRED EMBODIMENTS

Figure 1:
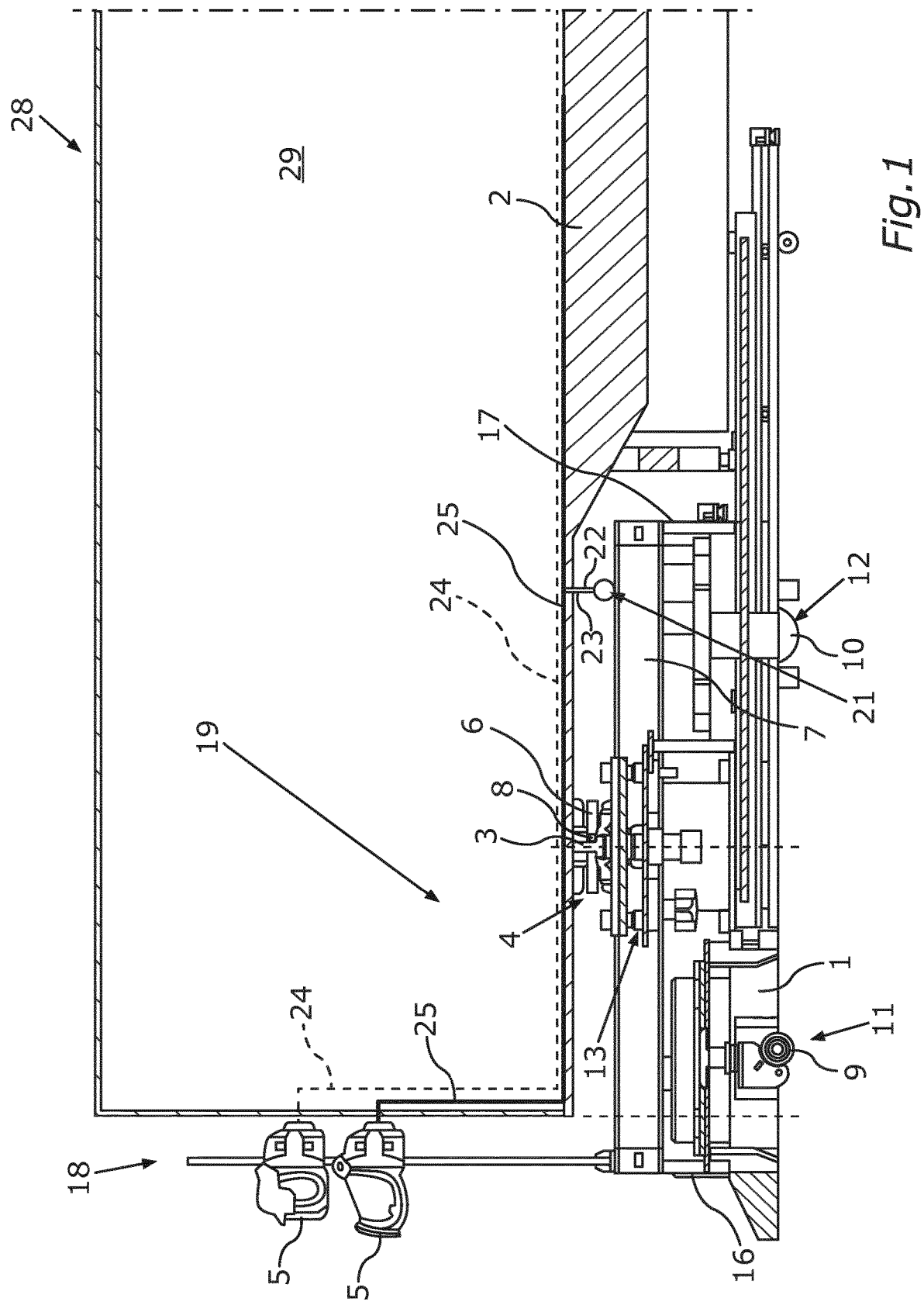
FIG. 1 a schematic representation of the connection of a driverless transport vehicle to the braking system of a semi-trailer according to a first embodiment, FIG. 2 a further schematic representation of the connection of a driverless transport vehicle to the braking system of a semi-trailer according to the first embodiment, FIG. 3 a schematic representation of the connection of a driverless transport vehicle to the braking system and electronic system of a semi-trailer according to a second embodiment, FIG. 4 a further schematic representation of the connection of a driverless transport vehicle to the braking system and electronic system of a semi-trailer according to the second embodiment.

In the embodiments and figures, identical or identically acting constituents can each be provided with the same reference characters. The illustrated elements and the size ratios thereof among each other are basically not to be regarded as true to scale. Rather, individual elements can be illustrated excessively thickly or largely dimensioned for better representability and/or for better comprehension.

FIG. 1 shows a driverless transport vehicle 1, which moves a semi-trailer 2. Herein, a coupling device 4 of the driverless transport vehicle 1 is connected to a kingpin 3 of the semi-trailer 2. It is to be noted that other vehicle/trailer combinations can fundamentally also be formed with the driverless transport vehicle 1, thus trailer combinations or the like.

As is apparent from FIG. 1, the driverless transport vehicle 1 serves for moving the semi-trailer 2 in particular within factory premises. Namely, it has turned out that the previous moving in factory premises, in which respective semi-trailers 2 or trailers are transported in production factories with a classical tractor, is not reasonable, in particular from economical view. Namely, these tractors are designed for the long-distance employment on the road and are not very efficient with respect to the energy consumption in drives in factory premises, which are mostly only very short in proportion to the long-distance employment. In addition, it often has to be maneuvered on the factory premises; however, the tractors are not very maneuverable.

For this reason, instead of a semi-trailer tractor, the driverless transport vehicle 1 is presently provided on the factory premises W, which can be automatically coupled to the semi-trailer 2. Hereto, the driverless transport vehicle 1 comprises the coupling device 4, which is connectable to the kingpin 3 of the semi-trailer 2 or connected to it in FIG. 2.

As is apparent from FIG. 1, the coupling device 4 comprises an adapter unit for connecting to the kingpin 3 in form- and/or force-fit manner, which here includes a usually employed fifth-wheel coupling. Herein, the fifth-wheel coupling comprises a fifth-wheel plate 6, which is carried by a structure or body 7 of the driverless transport system 1. A locking device 8 is integrated in the fifth-wheel plate 6, by means of which the kingpin 3 can be locked to the fifth-wheel plate 6. Thus, the fifth-wheel coupling serves for supporting and carrying the trailer 2 with intervention of the kingpin 3 on the one hand and for locking the kingpin 3 to the fifth-wheel plate 6 on the other hand among other things. Herein, a normalized fifth-wheel coupling 5 and fifth-wheel plate 6 are in particular employed to be able to receive and maneuver as many usual semi-trailers 2 as possible.

Figure 2:
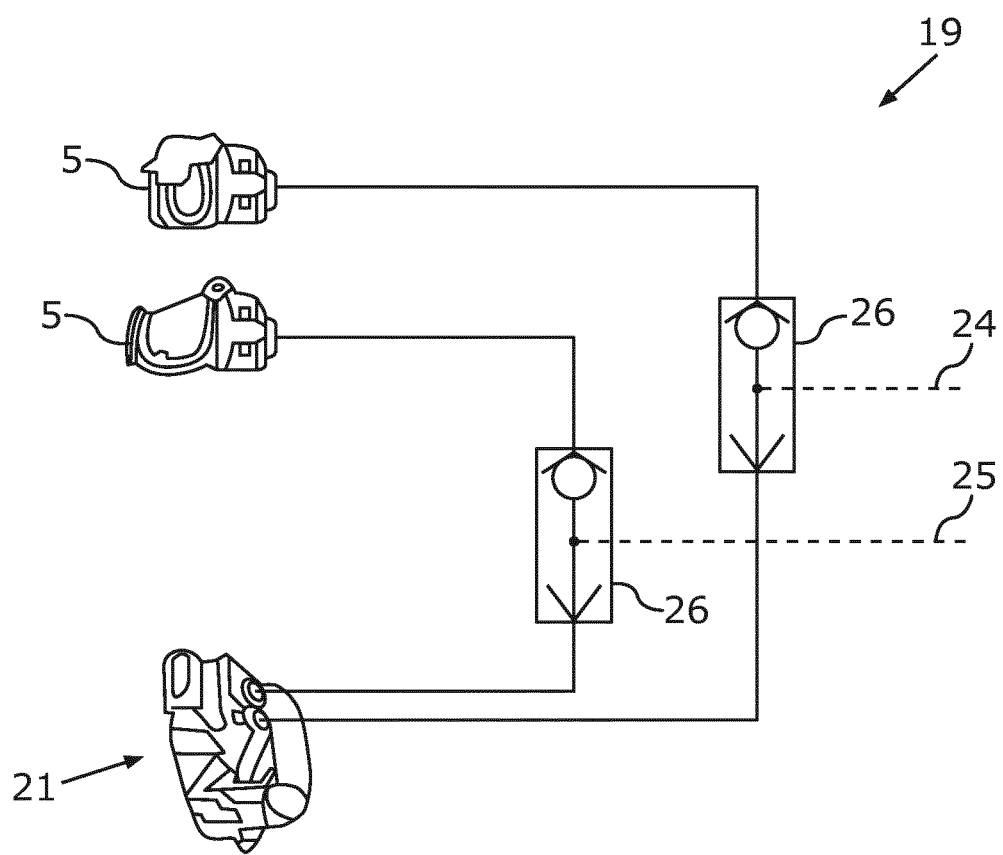

Furthermore, the driverless transport vehicle 1 comprises a plurality of drive wheels, of which respective front and rear drive wheels 9, 10 are shown in FIGS. 1 and 2. Here, they are controllable such that the driverless transport vehicle 1 is omnidirectionally movable. For example, at least two drive wheels 9, 10 can be formed such that they can be applied with different drive torques and/or oppositely oriented drive torques and/or oppositely oriented rotational directions. In particular, the driverless transport system 1 can comprise at least one front axle 11 and at least one rear axle 12 and corresponding, associated drive wheels 9, 10, respectively, which are operable with different drive torques and/or oppositely oriented drive torques and/or oppositely oriented rotational directions. Thus, the driverless transport vehicle 1 is for example omnidirectionally movable in vehicle longitudinal direction and vehicle transverse direction. It is clear that other configurations of driven and steerable wheels of the driverless transport vehicle 1 are also conceivable within the scope of the invention. Therein, the driverless transport vehicle 1 can also comprise rigid and/or non-driven wheels.

Furthermore, the driverless transport vehicle 1 comprises a device 13 for lifting the front end of the semi-trailer 2 such that it can be moved with the aid of its wheels 14, 15 at the rear end of the trailer 2. This device 13 can for example be a hydraulic device, by means of which the trailer 2 can be lifted immediately before and/or during and/or immediately after coupling the kingpin 3 to the fifth-wheel coupling, such that it can be moved by the driverless transport vehicle 1. In the present case, the hydraulic device 13 is arranged between the fifth-wheel coupling and the structure/body 7 of the driverless transport system 1. Herein, respective hydraulic elements, for example piston-cylinder elements, are for example arranged between the fifth-wheel plate 6 and the structure/body 7, by means of which the fifth-wheel plate 6 can be lifted and lowered in relation to the structure/body 7 in vehicle vertical direction.

In addition, the driverless transport vehicle 1 comprises a plurality of sensors for surroundings detection. For example, the driverless transport vehicle 1 can comprise a structure 7 with a substantially cuboid base body, at which at least four laser sensors or similar sensors are arranged. For example, respective sensors can be arranged at four different corners or edges 16, 17 of the base body 7 of the driverless transport vehicle 1. Therein, the driverless transport system 1 can recognize obstacles in the vicinity of the vehicle 1 and of the optionally attached semi-trailer 2 with the aid of the sensors and optionally drive around them or stop.

In addition, the driverless transport vehicle 1 can be connected to a central control of the factory premises for example by means of a transmit and/or receiver unit 18 to for example thus be guided to the corresponding trailers 1 and the corresponding unloading and/or loading sites, respectively.

By the driverless transport vehicle 1 or driverless transport system, automatically coupling the transport system 1 to the trailer 2 or similar trailer is additionally possible, wherein a connection to the braking system 19 and/or to the electronics of the trailer 2 is established. Hereto, the driverless transport vehicle 1 comprises a coupling device 21, which is configured to establish a connection to a braking system 19 and/or to the electronic system of a semi-trailer 2.

As is apparent from FIG. 1, corresponding compressed air ports 22 on the side of the driverless transport system 1 can be able to be coupled to compressed air ports 23 on the side of the trailer 2 by means of the coupling device 21. In particular, this coupling is to be automatically effected. Therein, according to the embodiment 2, the compressed air ports 22 of the trailer 2 are different from those compressed air ports 5, by means of which the trailer 2 is coupled to compressed air ports of a semi-trailer tractor. However, the same ports for coupling the trailer 2 to the truck and the driverless transport vehicle can here also be employed.

As is apparent from FIG. 1, the coupling device 21 of the embodiment according to FIG. 1 is arranged on the bottom side of the structure of the trailer 2 and on the top side of the structure/body of the driverless transport vehicle 1, respectively. Hereby, a particularly simple coupling results, in particular if the trailer 2 is lowered with its front end anyway for connecting to the kingpin.

As it becomes clear in synopsis with FIG. 2, a coupling of respective brake lines 24 and storage lines 25 is therein effected. On the side of the driverless transport vehicle 1, a compressor or reservoir for compressed air is provided to be able to supply the air pressure systems of the trailer 2. Besides the braking system 19, an air suspension of the trailer 2 can in particular also be supplied with compressed air, for example to lift the trailer for changing containers or to lift individual lift axles, whereby the maneuverability of the trailer 2 for maneuvering can be improved. Thus, other consumers within the trailer 2 could virtually also be supplied with compressed air from the driverless transport vehicle 1.

From FIG. 2, it is in particular apparent based on the schematically shown braking system 19 that the compressed air ports 22 of the trailer 2 are different from those compressed air ports 5, by means of which the trailer 2 is coupled to compressed air ports of a semi-trailer tractor. Herein, the switchover between the respective ports 5 of the truck and the ports 22 of the coupling device 21 of the driverless transport vehicle for the brake line 24 and storage line 25 is effected via respective shuttle valves 26.

Figure 3:
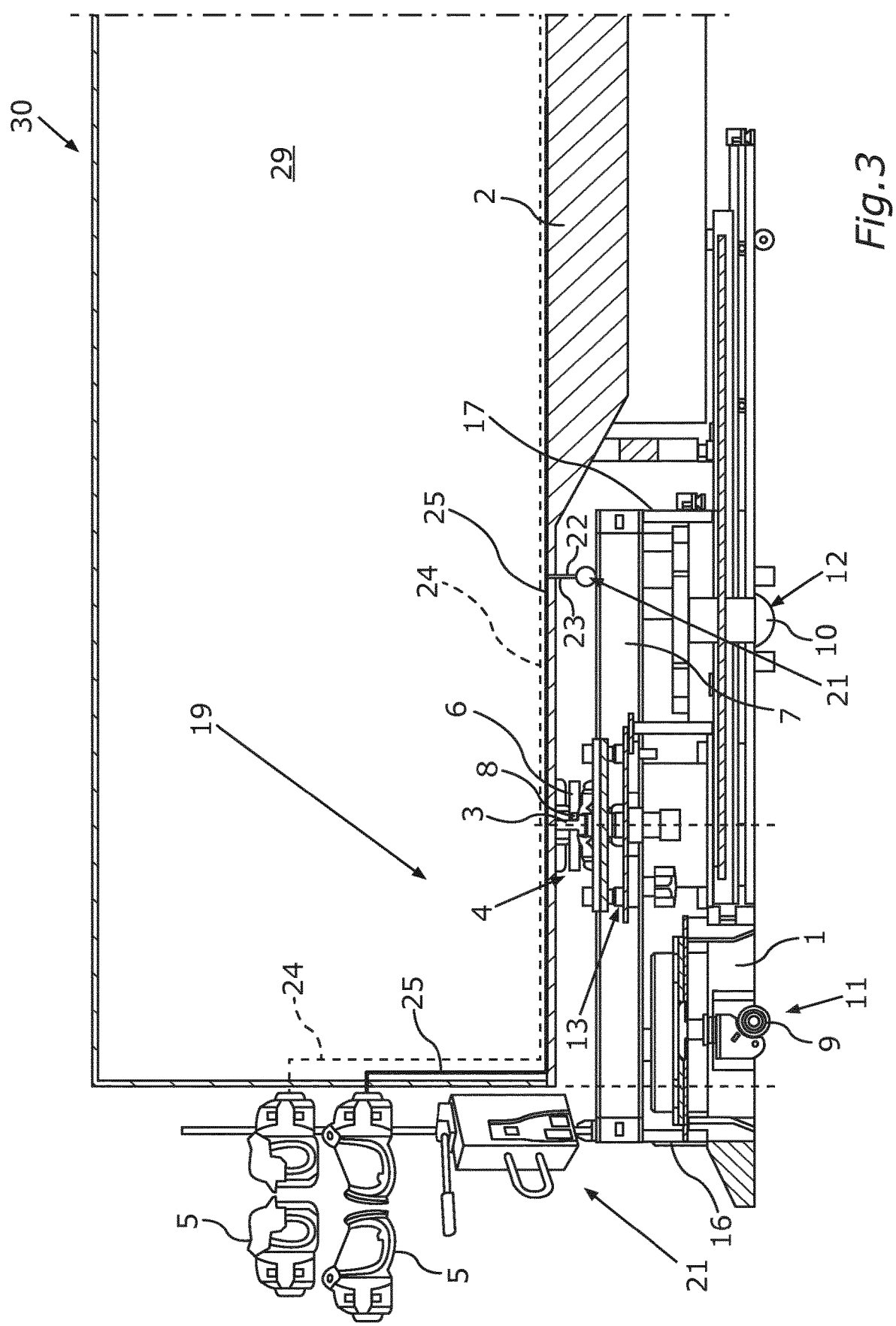
Figure 4:
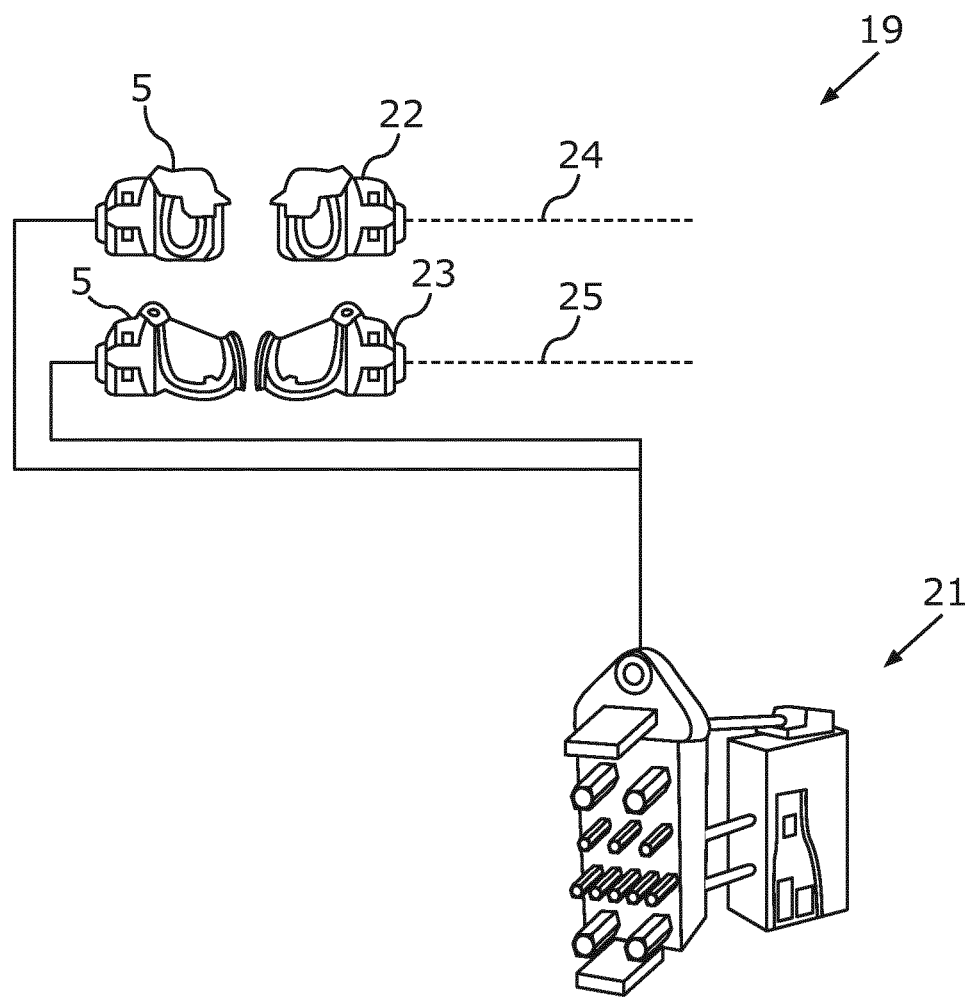

In FIGS. 3 and 4, an alternative, but fundamentally identical embodiment of the coupling of the respective ports is illustrated. In contrast to the embodiment according to FIGS. 1 and 2, the coupling of the compressed air ports 5 of the driverless transport vehicle 1 and of the trailer 2 is here effected on the front side of the structure of the trailer 2. Among other things, this has the advantage that one and the same compressed air ports 5 of the trailer 2 can be used for the connection to the truck and the coupling device 21 can be used for connection to the driverless transport vehicle 1. This is effected—as it is schematically apparent based on the circuit diagram according to FIG. 4—by means of a so-called multi-coupling 27.

In the operation, the driverless transport system 1 for example drives to below the trailer 2 and lifts it. Therein, the driverless transport system 1 automatically couples to the trailer 2. In the present case, both coupling of the braking system 19 and of the electronic system of the trailer 2 is effected. The brake of the trailer 2 is disengaged and the trailer 2 can be moved across the factory premises. For the control of the brake, a two-line compressed air port is presently required. Thus, the brake line 24 as well as the supply line 25 have to be connected with a compressed air coupling 21. Therein, the automatic coupling is for example possible from below (FIG. 1). Therein, the compressed air port is established between trailer 2 and driverless transport vehicle 1 with the aid of a multi-coupler (FIG. 2). On the other hand, coupling from the front is possible (FIG. 3). Therein, the compressed air lines are coupled with the aid of an adapter for example with a magnetic mount (FIG. 4).

By means of one and the same coupling device 21 or by means of a further coupling device, a connection of the driverless transport vehicle 1 to the electronic system of the trailer 2 is also effected. Thus, the environmental lighting, brake light, direction indicator and the electronic braking system can for example be used if the trailer 2 is moved by means of the driverless transport vehicle 1 as a vehicle/trailer combination or articulated truck. Thereby, the provisions of the road traffic regulations are satisfied and the trailer can be transported with the driverless transport vehicle 1 on the road or on the factory premises. In addition, the trailer 1 can also be moved at night. The trailer 2 is placed at the destination and the brake can again be fixed.

In order to be able to access the electronics of the trailer 2, a multipolar, in particular 15-pole plug, is for example automatically also coupled. Hereby, the different electronic systems of the trailer 2 can be coupled by means of a corresponding control device, which is for example accommodated in the driverless transport vehicle 1, and the trailer 2 can additionally be supplied with electrical energy.

In order to achieve automatic coupling of the coupling device 4 to the kingpin 3 at the fifth-wheel coupling and/or coupling of the coupling device 21 of the braking system 19 and/or electronic system of the trailer 2 to the driverless transport system 1, the coupling devices 4, 21 for example comprise respective sensors for automatically coupling. Hereby, the position of the fifth-wheel coupling in relation to the kingpin 3 or of the ports of the coupling device for brake and electronics on the side of the driverless transport system 1 and of the trailer 2 can for example be ascertained.

Herein, it would be conceivable to support the fifth-wheel coupling 5 relatively movable to the structure/body 7 of the driverless transport vehicle 1 in vehicle transverse direction and/or in vehicle longitudinal direction such that the fifth-wheel coupling 5 can be (finely) adjusted in relation to the kingpin 3 according to relative position ascertained by means of the sensor technology until the coupling position between fifth-wheel coupling 5 and kingpin 3 is achieved. If a coarse adjustment between fifth-wheel coupling 5 and kingpin 3 is in particular required, it can be effected by moving the driverless transport vehicle 1 in relation to the kingpin 3. Optionally, the positioning of the fifth-wheel coupling 5 in relation to the kingpin 3 can also be performed exclusively by moving the driverless transport vehicle 1. After achieved coupling position between fifth-wheel coupling 5 and kingpin 3, which is for example captured via a corresponding sensor technology, the automatic locking of the kingpin 3 to the fifth-wheel coupling 5 can then be effected by means of the locking device 8. Decoupling after maneuvering the trailer 1 can be effected in correspondingly reversed order in that the locking device 8 is first detached and then the fifth-wheel coupling 5 is disengaged from the kingpin 3 by assistance by means of the sensor technology, in that for example the driverless transport vehicle 1 is moved and/or the fifth-wheel coupling 5 is moved in relation to the structure/body 7.

The coupling device 21 for the braking and/or electronic system of the trailer 2 can for example also be displaced in sensor-monitored and sensor-controlled manner in that corresponding adjusting actuators or the like are provided. Thus, the connection and locking of the respective ports, plugs or the like can also be automatically effected.

Additionally, it is also conceivable that after placing the trailer 2, the structure 28 thereof, for example the sidewall 29 thereof, is automatically opened. For example, a sidewall 29 can be automatically opened since one has access to the electronics of the trailer 2 by the multipolar plug.

The invention claimed is:

1. A driverless transport vehicle for moving a semi-trailer or similar trailer, comprising:
   a first coupling device, which is configured to establish a connection to a braking system and/or to an electronic system of a semi-trailer or similar trailer;
   wherein the first coupling device is configured for automatic coupling to the braking system and/or to the electronic system of the semi-trailer or similar trailer by determination of a relative position of the first coupling device to the semi-trailer and automated movement and engagement of the first coupling device to the semi-trailer or similar trailer.

2. The driverless transport vehicle according to claim 1, wherein the first coupling device comprises at least one compressed air port.

3. The driverless transport vehicle according to claim 1, wherein the first coupling device comprises two compressed air ports, a compressed air port for a brake line and a compressed air port for a supply line or storage line.

4. The driverless transport vehicle according to claim 1, wherein the first coupling device comprises a plug.

5. The driverless transport vehicle according to claim 1, further comprising:
a body having a low profile configured to move underneath the semi-trailer or similar trailer;
wherein the first coupling device is disposed on a top surface of the body and configured to engage an underside of the semi-trailer or similar trailer to couple the first coupling device to the semi-trailer or similar trailer and a port or ports thereof from below.

6. The driverless transport vehicle according to claim 1, wherein the first coupling device is formed to couple to the semi-trailer or similar trailer and a port or ports thereof at a front of the semi-trailer or similar trailer.

7. The driverless transport vehicle according to claim 1, further comprising a second coupling device for automatically coupling the driverless transport vehicle to a kingpin of the semi-trailer or similar trailer.

8. The driverless transport vehicle according to claim 1, wherein the first coupling device is configured to automatically open a sidewall of the semi-trailor or similar trailer after establishing a connection to the electronic system of the semi-trailer or similar trailer.

9. A method for coupling a driverless transport vehicle to a semi-trailer or similar trailer, comprising the following steps:
providing a driverless transport vehicle according to claim 1,
providing a semi-trailer or similar trailer to be moved,
connecting the first coupling device of the driverless transport vehicle to a braking system and/or an electronic system of the semi-trailer or similar trailer.

10. The driverless transport vehicle according to claim 4, wherein the plug is a multipolar plug.

11. The driverless transport vehicle according to claim 1, further comprising a plurality of sensors configured to align one or more ports and/or plugs of the vehicle with corresponding one or more ports and/or plugs of the semi-trailer or similar trailer to facilitate the automatic coupling.

12. The driverless transport vehicle according to claim 3, wherein:
the first coupling device comprises one or more valves to switch over between the two compressed air ports of the first coupling device and two other compressed air ports.

13. The driverless transport vehicle according to claim 6, wherein one or more compressed air ports of the semi-trailer or similar trailer are configured for connection to one or more corresponding compressed air ports of a truck and separately for connection to one or more corresponding compressed air ports of the first coupling device.

14. The driverless transport vehicle according to claim 1, further comprising:
a body having a low profile configured to move underneath the semi-trailer or similar trailer;
wherein the first coupling device is disposed on a top surface of the body and configured to engage an underside of the semi-trailer or similar trailer;
wherein a second coupling device is disposed on the top surface of the body for automatically coupling the driverless transport vehicle to a kingpin of the semi-trailer or similar trailer.

* * * * *